(12) United States Patent
Dent

(10) Patent No.: US 6,532,290 B1
(45) Date of Patent: Mar. 11, 2003

(54) AUTHENTICATION METHODS

(75) Inventor: Paul Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/258,414

(22) Filed: Feb. 26, 1999

(51) Int. Cl.[7] .............................. H04K 1/00; H04L 9/00
(52) U.S. Cl. ...................................... 380/247; 713/168
(58) Field of Search ................................ 380/247, 248, 380/258, 270, 273; 713/168, 169

(56) References Cited

U.S. PATENT DOCUMENTS

| | | |
|---|---|---|
| 4,799,061 A | 1/1989 | Abraham et al. |
| 5,091,942 A | 2/1992 | Dent |
| 5,282,250 A | 1/1994 | Dent et al. |
| 5,390,245 A | 2/1995 | Dent et al. |
| 5,559,886 A | 9/1996 | Dent et al. |
| 5,668,875 A | 9/1997 | Finkelstein et al. |
| 5,604,806 A | 4/1998 | Hassan et al. |
| 5,745,578 A | 4/1998 | Hassan et al. |
| 5,872,917 A * | 2/1999 | Hellman ..................... 709/229 |
| 5,995,624 A * | 11/1999 | Fielder et al. .............. 380/283 |

* cited by examiner

*Primary Examiner*—Matthew B. Smithers
(74) *Attorney, Agent, or Firm*—Coats & Bennett, P.L.L.C.

(57) ABSTRACT

In one way to improve the security of bilateral authentication procedures while keeping transmission overhead to a minimum, a first party wishing to initiate communications with a second party generates a random number having a first number of digits. The first party the enciphers the random number using a secret ciphering key to obtain an enciphered version of the random number that has a second number of digits greater or equal to the first number. A third number of selected digits of the enciphered random number are then transmitted to the second party, where the third number is less than the first number. The second party receives the digits transmitted from the first party and expands the third number of digits in a pre-agreed manner to obtain the second number of digits. The second party then deciphers the second number digits using the second party's secret key to obtain the first number of digits, which is not equal to the original random number chosen by the first party. The so-obtained first number of digits is then used by the second party as a ciphering key to encipher the second party's secret key thereby obtaining an enciphered key containing the second number of digits. A fourth number of digits less than the second number are then selected by the second party and transmitted to the first party. The first party also expands the third number of digits it transmitted to the first party in the same pre-agreed manner to obtain the second number of digits and then deciphers this so-obtained second number of digits using its secret key to obtain a first number of digits once more. The first party then selects from these a fourth number of digits less than the second number in the same manner as the second party, and compares the selected fourth number of selected digits with the fourth number of digits received from the second party. If a match is detected, the first party has verified that the second party possesses the same secret key as itself. The roles may be reversed to allow the second party to verify the identity of the first party, either by repeating the above procedure starting with a new random number chosen by the second party, or else continuing to derive a number of digits to be returned from the first party to the second party based on the digits received from the second party and the first party's secret key.

36 Claims, 7 Drawing Sheets

AUTHENTICATION METHODS

BACKGROUND

This invention relates to telecommunication and more particularly to multiple access telecommunication and even more particularly to cellular radio telephone communication. This invention enables a first party electronically to verify the identity of a second party and vice versa before the parties engage in enciphered communications using a ciphering key provided as a byproduct of the identity-verification process.

The problem of ensuring the security of a communication session, whether the session involves audio, video, or another kind of data, is not a new one. U.S. Pat. No. 4,799,061 to Abraham et al. describes a system for authenticating components in a communication system that is illustrated by FIG. 1. A first party wishing to initiate communication with a second party chooses a random number which is applied at point A with the first party's secret key as inputs of an enciphering algorithm 1. The first party's algorithm 1 enciphers the random number according to the secret key, and the resulting enciphered random number is transmitted by the first party to the second party. The second party applies the received enciphered random number with its own secret key as inputs of a deciphering algorithm 2. The deciphering algorithm 2 reproduces at point B the random number applied by the first party at point A only if the second party's secret key is the same as the first party's secret key and their algorithms are the same. The second party applies the reproduced random number with its secret key as inputs of the second party's enciphering algorithm 1. The second party's algorithm 1 enciphers the second party's secret key according to the reproduced random number, and the resulting enciphered second party's secret key is transmitted by the second party to the first party. The first party deciphers the received enciphered second party's secret key using its random number as the deciphering key in its deciphering algorithm 2. A comparator 3 determines whether the first party's secret key and the deciphered second party's secret key are the same; if they are, the first party has authenticated the second party, which in this context is to say that both parties are using the same algorithms and keys. Communication then proceeds using the random number, which both parties now possess, as a ciphering and deciphering key.

The system described in the Abraham patent has a number of disadvantages. In order for the second party to be able to reproduce at point B the same random number inserted by the first party at point A, the transmission from A to B must be "information lossless". One of the consequences of information-lossless transmission is that the number of digits of the enciphered random number transmitted from the first party to the second party cannot be less than the number of digits of the random number. If fewer digits were transmitted, there would inevitably be less information transmitted than necessary to reproduce the random number. Indeed, the characteristics of cipher algorithms are such that not even a single digit of the random number would be guaranteed to be reproduced error free at point B unless sufficient information is contained in the enciphered random number.

Furthermore, the Abraham patent uses the random number for enciphering the second party's key for transmission. If this transmission is intercepted and the random number contains a lower number of digits (i.e., is shorter than) the key, it will be easier for an eavesdropper to crack the ciphering and thereby read the secret key than it would be to crack the secret key itself. Thus, the security of the system is no greater than that determined by the length of the random number. To avoid compromising the degree of security afforded by the secret key, the length of the random number must be greater than or equal to the length of the key, and thus the enciphered random number transmitted from the first party to the second party must also be longer than the key. Choosing a long key for adequate security, however, requires significant transmission time, which is a scarce or expensive resource in some communication systems, for example, cellular telephone systems.

Nevertheless, the need for communication security is acute in flexible systems like cellular telephony. In the United States, losses due to cellular telephone fraud run into the hundreds of millions of dollars, forcing manufacturers, service providers, the Federal Communications Commission (FCC) and industry trade groups to investigate a number of techniques for combating such fraud. One technique involves authenticating both the radio base station and the mobile station, i.e., both ends of a communication link, in order to avoid connection to fraudulent entities.

A simplified layout of a cellular communications system is depicted in FIG. 2. Mobile telephones M1–M10 communicate with the fixed part of a public switched network by transmitting radio signals to, and receiving radio signals from, cellular base stations B1–B10. The cellular base stations B1–B10 are, in turn, connected to the public switched network via a Mobile Switching Center (MSC). Each base station B1–B10 transmits signals within a corresponding area, or "cell" C1–C10. As depicted in FIG. 2, an idealized arrangement of base stations are organized so that the cells substantially cover an area in which mobile telephone communication ordinarily occurs (e.g., a metropolitan area), with a minimum amount of overlap.

When a user activates a mobile telephone within a cell, the mobile telephone transmits a signal indicating the mobile telephone's presence to the cell's base station. The mobile telephone transmits the signal, which may include its electronic serial number (ESN), in a designated set-up channel that is continuously monitored by each base station. When the base station receives the mobile telephone's signal, it registers the mobile telephone's presence within the cell. This process can be repeated periodically so that the mobile telephone is appropriately registered in the event that it moves into another cell.

When a mobile telephone number is dialed, a telephone company central office recognizes the number as a mobile telephone and forwards the call to the MSC. The MSC sends a paging message to certain base stations based on the dialed mobile telephone number and current registration information. One or more of the base stations transmits a page on its set-up channel. The dialed mobile telephone recognizes its identification on the set-up channel, and responds to the base station page. The mobile telephone also follows an instruction to tune to an assigned voice channel and then initiates ringing. When a mobile user terminates a communication, a signaling tone is transmitted to the base station, and both sides release the voice channel.

In the above described operation, mobile telephones are not connected permanently to a fixed network but instead communicate through a so-called "air interface" with a base station. This, of course, provides the flexibility of cellular communication systems, since a user can readily transport a mobile telephone without the restriction of being physically linked to a communication system. This same feature, however, also creates difficulties with respect to securing information transmitted over cellular telephone systems.

For example, in ordinary wired telephone systems, a central office exchange can identify a particular subscriber to be billed for use of a telephone set by the communication line to which it is physically attached. Thus, fraudulent use of a subscriber's account typically requires that a physical connection be made to the subscriber's line. This presents a risk of discovery to a would-be fraudulent user.

Cellular telecommunication systems, on the other hand, pose no such connection problem for the would-be fraudulent user since these systems communicate over an air interface. Absent protection schemes, fraudulent users can use another subscriber's account by accessing the other subscriber's ESN as it is transmitted to the network at various times for establishing and maintaining communications.

In establishing a standard cellular connection, two identification codes are typically transmitted by a mobile telephone to the system. These are the Mobile Identification Number (MIN) and the ESN. The MIN identifies a subscriber, while the ESN identifies the actual hardware being used by the subscriber. Accordingly, it is expected that the MIN corresponding to a particular ESN can, due to subscribers purchasing new equipment, change over time. The MIN is a 34-bit binary number derived from a 10-digit directory telephone number, while the ESN is a 32-bit binary number that uniquely identifies a mobile telephone. The ESN is typically set by the mobile telephone manufacturer.

A conventional authentication method utilized in setting up communications in, for example, the Advanced Mobile Phone System (AMPS), is illustrated by the flowchart depicted in FIG. 3. According to this method, a base station receives both an ESN and a MIN from the mobile telephone at block 200. These identification codes are designated $ESN_m$ and $MIN_m$ to indicate that they are received from the mobile telephone. Next, at block 202 the base station retrieves an $ESN_{sys}$ which corresponds to $MIN_m$ from a system memory. $ESN_{sys}$ is then compared with $ESN_m$ at block 204. If the two serial numbers are the same, the flow proceeds to block 206 and system access is permitted. Otherwise, system access is denied at block 208.

One drawback to this system is that it is relatively simple for a fraudulent user to assemble valid MIN/ESN combinations by eavesdropping on the air interface or from other sources. Since accesses according to this conventional system are presumed valid if the MIN and ESN received from the mobile telephone correspond with those stored in system memory, all of the necessary information for fraudulent access can be obtained by electronic eavesdropping.

U.S. Pat. No. 5,091,942 to Dent; and U.S. Pat. No. 5,282,250; U.S. Pat. No. 5,390,245; and U.S. Pat. No. 5,559,886, all to Dent et al., are directed to the problem of communication security in systems like cellular telephone systems, and all of these patents are expressly incorporated here by reference. These patents solve the above-mentioned problems with prior cellular telephone methods and the method of the Abraham patent by methods such as that illustrated by FIG. 4.

The first party, who generally would be the party initiating communication, chooses a random number rand and transmits rand to the second party. In addition, the first party uses an authentication algorithm 10 to encipher rand according to the first party's secret key, generating an enciphered random number having two parts, resp1 and resp2. The first party also transmits resp2 to the second party. The second party enciphers the received rand with its local version of the authentication algorithm 10 according to the second party's secret key, generating an enciphered random number having two parts, resp1' and resp2'. The second party uses a comparator 11 to determine whether resp2' matches resp2; a match indicates to the second party that the first party is probably authentic and merits a reply. The second party's reply to the first party includes resp1'. The first party uses a comparator 12 to determine whether the received resp1' matches resp1; a match indicates to the first party that the second party is probably authentic. Such authentication of both ends of a communication can be called bilateral authentication.

In contrast to the prior methods, the lengths of the quantities rand, resp2, and resp1' that are exchanged by the parties are not critical to the security of the system depicted in FIG. 4. In fact, they may have fewer digits than the secret keys. The numbers of digits need only be sufficient that a second party not in possession of the same secret key as the first party has a negligible probability by chance of getting resp1' equal to the value resp1 expected by the first party and that the first party has a negligible probability by chance of getting a value resp2 equal to the value of resp2' that will be computed by the second party. For example if resp1 and resp2 both have sixteen binary digits (bits), the chances are only 1/65,536 of getting such a value right by accident, which is sufficiently low to render a guessing game unprofitable for many useful communication systems. Moreover, using a combined length of resp1 and resp2 that is much shorter than the length of the secret key means that insufficient information is transmitted to permit a unique determination of the key, even if sufficient computing power is available to try all possible keys. Even so, the method of FIG. 4 leaves one at liberty to choose long keys to make such computation impractical, without incurring the transmission time overhead of exchanging long authentication quantities between the parties.

On the other hand, the method of FIG. 4 might be weakened if an eavesdropper can collect several sets of rand, resp2 pairs from a genuine first party that could then be used to address a genuine second party or to attempt to crack the secret key. The patents incorporated by reference above disclose ways of hindering the latter weakness, including the use of rolling keys. U.S. patent application Ser. No. 08/706, 574 by Osborn for a "System for Preventing Electronic Memory Tampering" addresses the former weakness, and is expressly incorporated here by reference.

It is, however, still important to improve the security of bilateral authentication procedures while keeping transmission overhead to a minimum. These objectives or advantages are obtained when practicing the authentication methods described in this application.

SUMMARY

A first party wishing to initiate communications with a second party generates a random number comprising a first number of digits. The first party then enciphers the random number using a secret ciphering key to obtain an enciphered version of the random number comprising a second number of digits greater or equal to the first number. A third number of selected digits of the enciphered random number are then transmitted to the second party, where the third number is less than the first number.

The second party receives the digits transmitted from the first party and expands the third number of digits in a pre-agreed manner to obtain the second number of digits. The expansion process can be as simple as padding out the third number of digits with constant digits such as zeros.

The second party then deciphers the so-obtained second number digits using the second party's secret key to obtain the first number of digits, which is not equal to the original random number chosen by the first party. The so-obtained first number of digits is then used by the second party as a ciphering key to encipher the second party's secret key thereby obtaining an enciphered key containing the second number of digits. A fourth number of digits less than the second number are then selected by the second party and transmitted to the first party.

The first party also expands the third number of digits it transmitted to the first party in the same pre-agreed manner to obtain the second number of digits and then deciphers this so-obtained second number of digits using its secret key to obtain a first number of digits once more. The first party then selects from these a fourth number of digits less than the second number in the same manner as the second party, and compares the selected fourth number of selected digits with the fourth number of digits received from the second party. If a complete match is detected, the first party has verified that the second party possesses the same secret key as itself.

The roles may then be reversed to allow the second party to verify the identity of the first party, either by repeating the above procedure starting with a new random number chosen by the second party, or else continuing to derive a number of digits to be returned from the first party to the second party based on the digits received from the second party and the first party's secret key.

In a more general implementation of the above, the steps of selecting a smaller number of digits from a larger number of digits may be replaced by a step of generating a smaller number of digits from a larger number of digits using a pre-agreed compression algorithm, which can also depend on the secret key available to the party performing the compression.

In addition, if savings in computational effort are thereby achieved, whenever a smaller number of digits only are needed, the larger number of digits do not all need to be generated.

BRIEF DESCRIPTION OF THE DRAWINGS

The features, objects, and advantages of Applicant's invention will be understood by reading this description in conjunction with the accompanying drawings, in which.

DETAILED DESCRIPTION

The invention is applicable in a communication system having user terminals, such as cellular telephones, that seek to receive service from a communication network, such as a group of cellular base stations.

Figure 4:
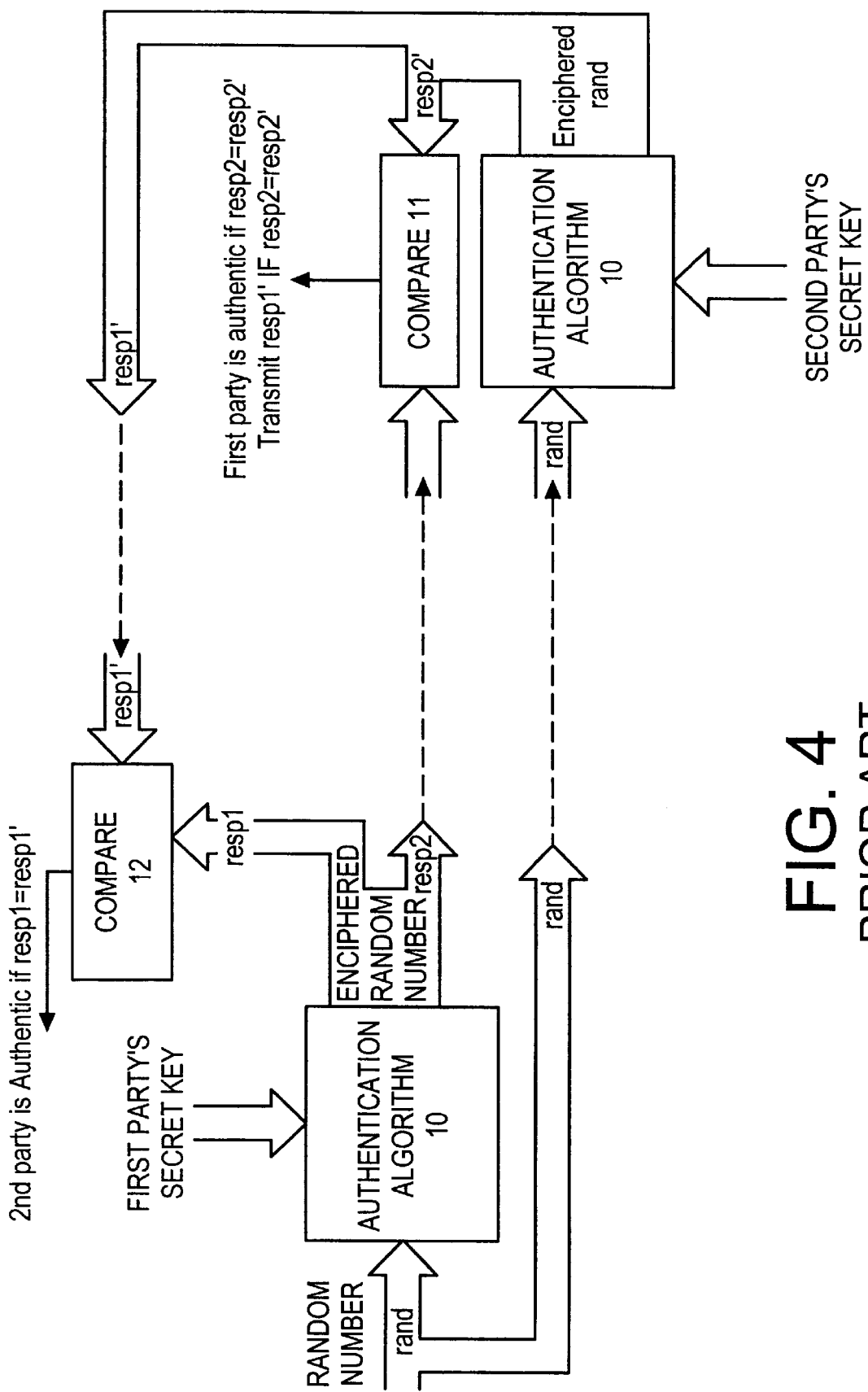
FIG. 4 illustrates a prior bilateral authentication method.
Figure 5:
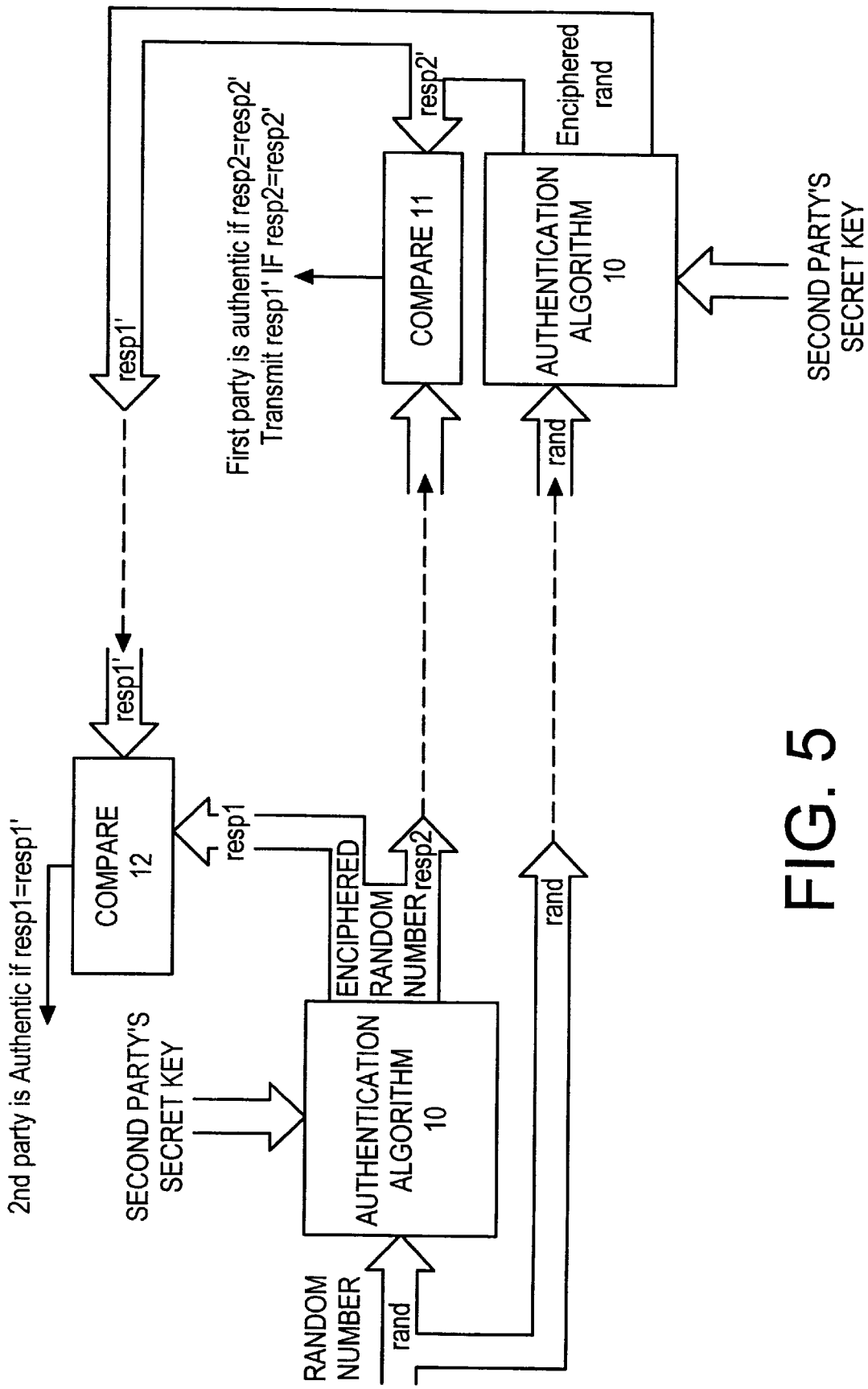
FIG. 5 illustrates an authentication method in accordance with the invention.

A first implementation of the invention may be described with the aid of FIG. 5, which is based on FIG. 4. Suppose in a first case that the network wishes to initiate communication with a terminal. Then, the first party of FIGS. 4 and 5 is the network, which sends the pair (rand, resp2) to the terminal, which is the second party. In FIG. 5, the network uses for the "first party" secret key the secret key it assigned to the genuine second party (the user terminal), rather than its own secret key as in FIG. 4. The second party replies with resp1' only if the received resp2 matches its locally computed resp2', as shown in FIGS. 4 and 5. In this way, a false network that cannot compute resp2 cannot cause a genuine terminal to reply with a value resp1', and this the method depicted in FIG. 5 avoids a problem with prior authentication methods.

In principle, an eavesdropper can attack the method of FIG. 5 by performing the complicated sequence of:

1. placing a call via the network to a genuine terminal, thereby causing the network to transmit the (rand, resp2) pair to the genuine terminal;
2. intercepting the (rand, resp2) pair transmitted by the network; using the pair to address the same genuine terminal, thereby causing the terminal to respond with resp1'; (of course, the eavesdropper can also merely wait for the genuine terminal to respond to the network with resp1';) and intercepting resp1' transmitted by the terminal; and
3. later, initiating a call to the network, receiving an authentication challenge (rand, resp2) pair and replying with the resp1' obtained in step 2 in order to gain fraudulent access.

This kind of fraud, which may be called "fraud with the help of a genuine terminal", can be prevented for telephone systems by including dialed digits as inputs to the authentication algorithm 10, as described in the '942, '250, '245, and '886 patents incorporated by reference above. Thus, when the network initiates a call to a telephone, the value of resp2 is generated by the algorithm 10 in FIG. 5 based on the random number rand, the secret key assigned to the called party, and all or part of the called party's telephone number.

On the other hand when a telephone initiates a call to the network (the first party in FIG. 5 is the caller), the value resp1' that the network (the second party in FIG. 5) requires for authentication is generated by both the network and the caller based on the random number rand, the caller's secret key, and all or part of the telephone number of the called party. Thus an eavesdropper at step 3 would only possess a resp1' that is valid for calling himself and could not place calls to a third party.

Although the bilateral authentication method depicted in FIG. 5 has a number of advantages over prior methods, practical problems in some communication systems, such as distributed mobile telephone switching systems, may hinder the use of dialed digits in this way, as described in Applicant's '942 patent cited above. Accordingly, further bilateral authentication methods are described below.

Figure 6:
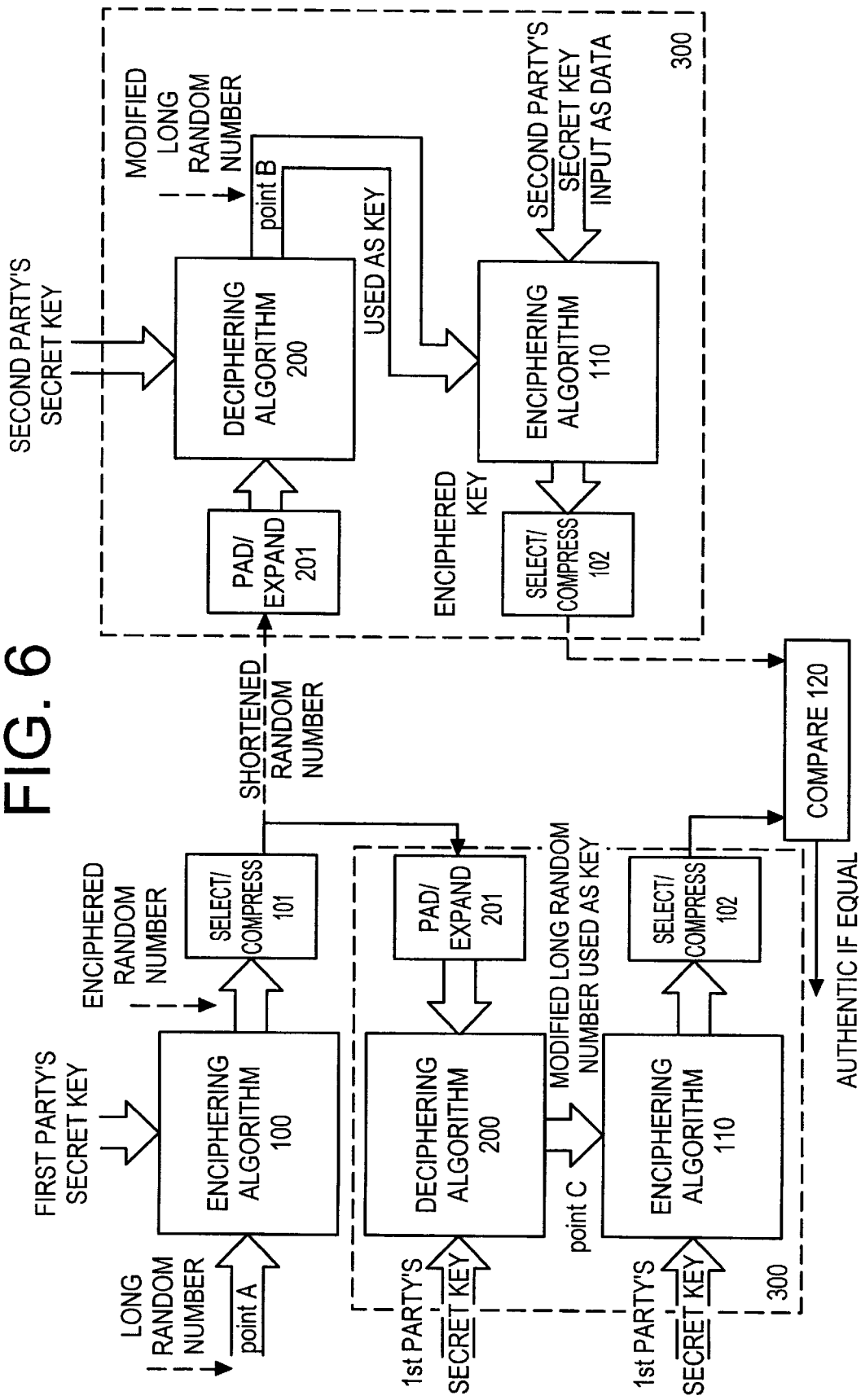
FIG. 6 illustrates an authentication method in accordance with the invention.

Another method of bilateral authentication in accordance with Applicant's invention is illustrated by FIG. 6. In a first implementation, a first party, e.g., one wishing to initiate communications, generates a random number, which may be long, i.e., the random number can comprise any number of digits. The random number is applied at point A to an enciphering algorithm 100, which generates an enciphered random number in accordance with the first party's secret key that is also applied to the algorithm 100. In contrast to the Abraham patent and FIG. 1, however, the enciphered random number need not comprise as many digits as the unenciphered random number, e.g., the enciphering algorithm 100 can be an "information-lossy" algorithm.

It will be understood that if the algorithm 100 is not information-lossy, the enciphered random number can also be shortened by selecting predetermined digits or by otherwise truncating or compressing it, as indicated by a select/compress operation 101. The combination of the enciphering algorithm 100 and the select/compress operation 101 forms an information-lossy algorithm in that an output of the algorithm can never be inverted to reveal the inputs to the algorithm, i.e., the random number and the secret key.

The shortened enciphered random number is then transmitted from the first party to the second party, who deciphers the received value using a deciphering algorithm 200. If the algorithm 200, in correspondence with a pseudo-inverse of the algorithm 100, requires a number of input digits equal to the number of output digits generated by the algorithm 100, then the received shortened enciphered random number is expanded as necessary by a pad\expand operation 201. The shortened enciphered random number is decompressed or padded out with predetermined digits such as zeros to obtain the desired number of input digits for the second party's algorithm 200.

The second party's algorithm 200 deciphers the enciphered random number, expanded if necessary, thereby producing a modified random number at point B. The modified random number may have the same number of digits as the first party's random number, although none of those digits are guaranteed to be the same as the digits of the first party's random number. The modified random number is applied as an enciphering key to the second party's enciphering algorithm 110 for enciphering the second party's secret key, which is applied as data to the algorithm 110.

Figure 1:
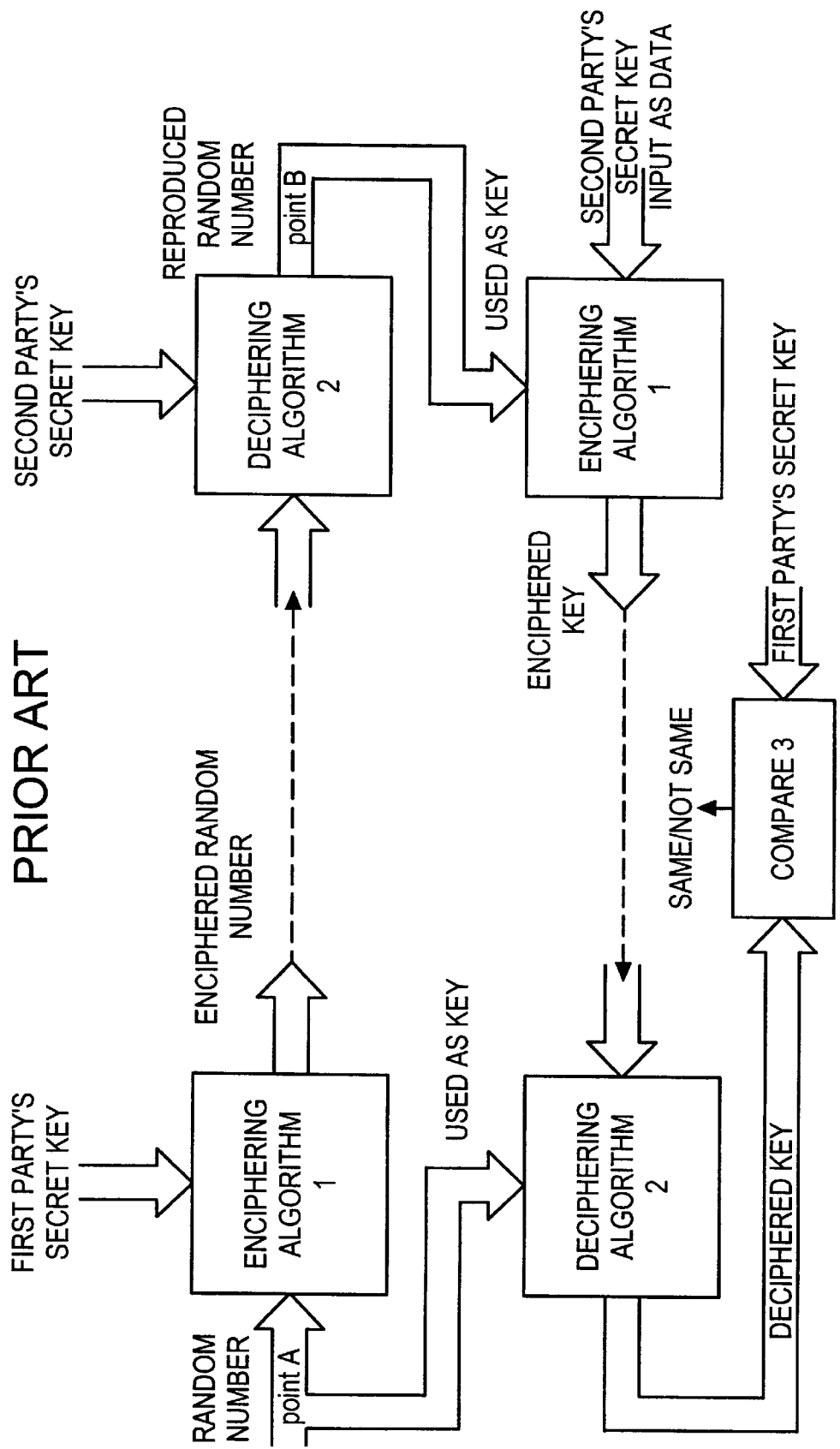
FIG. 1 illustrates a prior system for authenticating components in a communication system.
Figure 2:
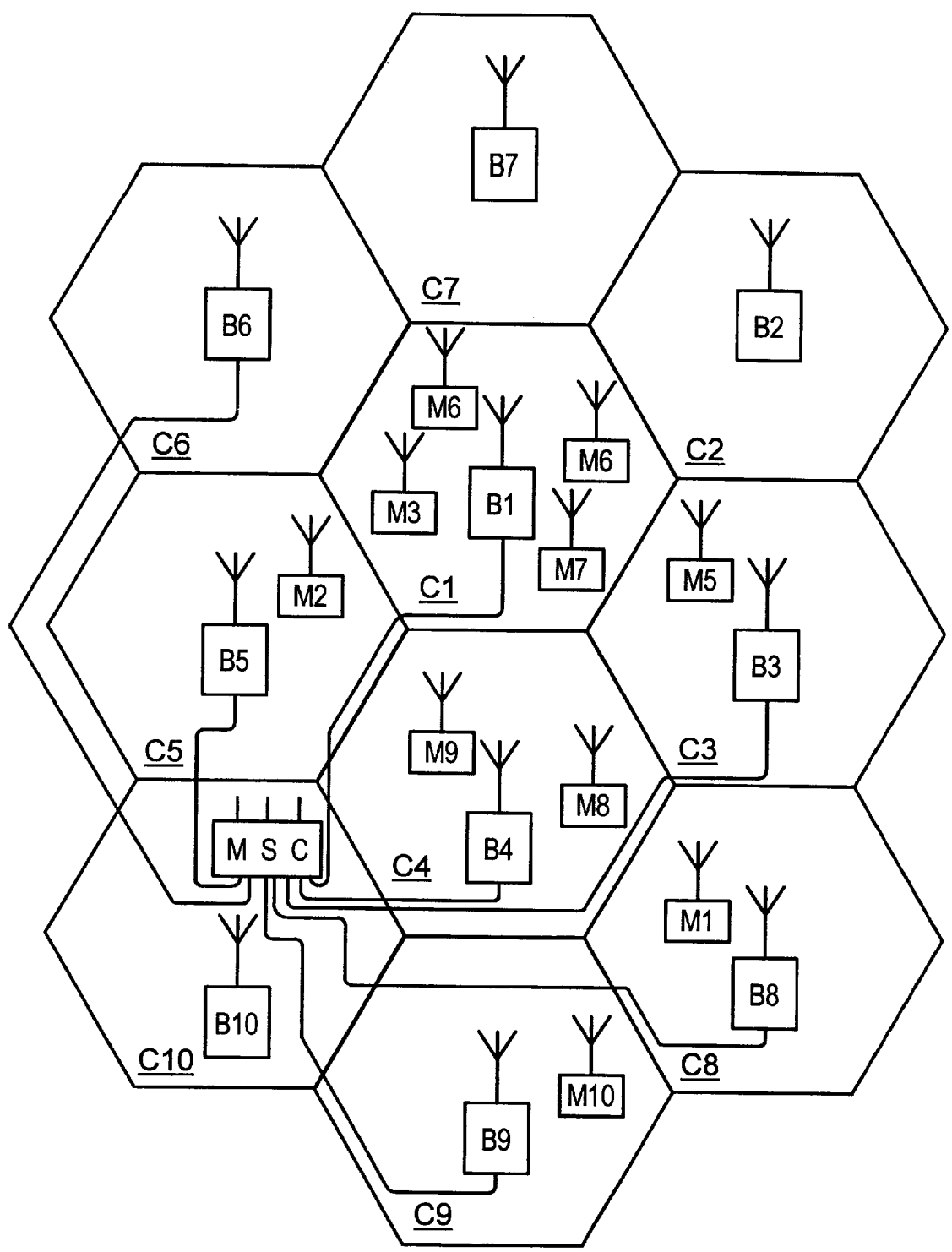
FIG. 2 illustrates a simplified layout of a cellular communications system.
Figure 3:
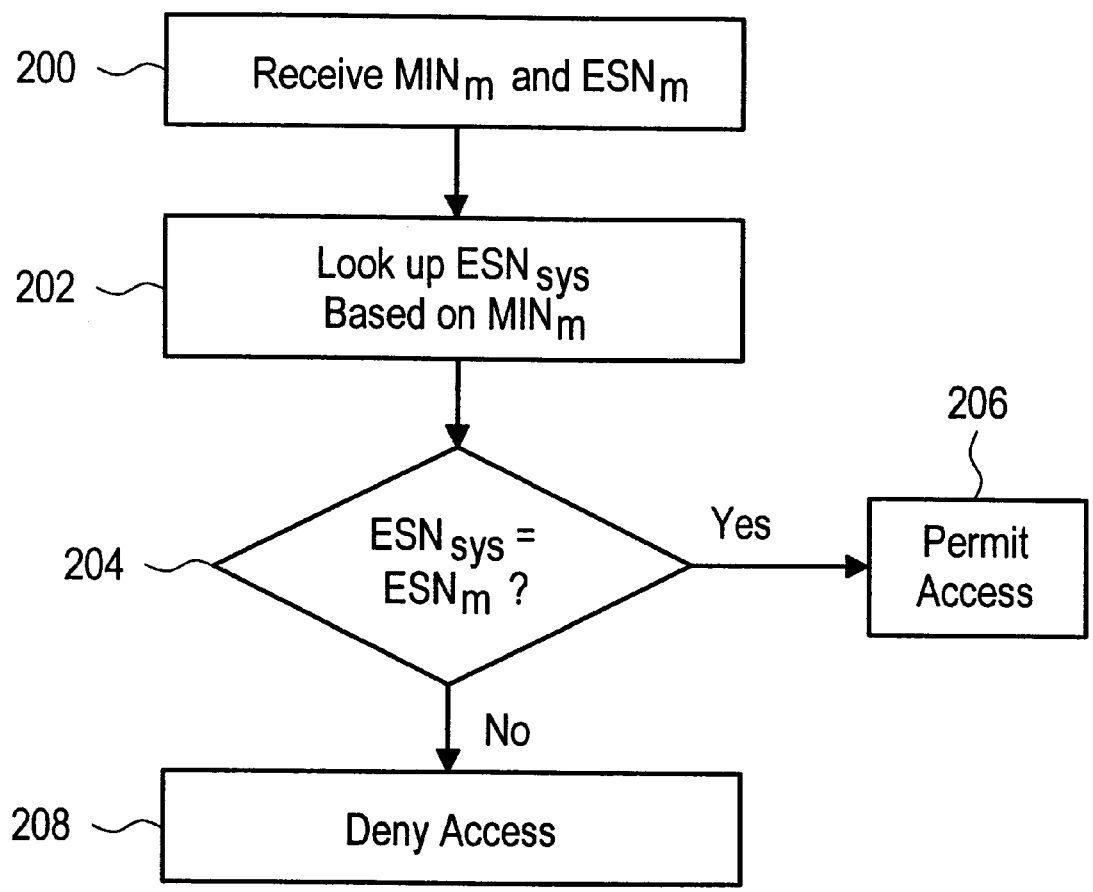
FIG. 3 illustrates a conventional authentication method.

In contrast to the Abraham patent and FIG. 1, the algorithm 110 can be an information-lossy algorithm like algorithm 100, and may even be the same as the algorithm 100, although the latter is not necessary. The number of digits of the enciphered second party's secret key that is generated by the algorithm 110 may therefore be fewer than the number of digits of either the modified random number or the second party's secret key. If desired, the number of digits can be further reduced by a select/compress operation 102 that selects predetermined output digits or otherwise compresses the enciphered second party's secret key. As noted above, the combination of the algorithm 110, even if it is information-lossless, and the select/compress operation 102 forms an information-lossy algorithm, which is to say that it is impossible to invert the output of the algorithm to obtain both inputs to the algorithm 110.

The second party transmits the enciphered second key, compressed if desired, to the first party. In contrast to the Abraham patent and FIG. 1, the first party in FIG. 6 is not able to decipher the received enciphered second party's key using the random number from point A as a deciphering key, and so the first party would not be able to compare the second party's key to its own key. Instead in accordance with Applicant's invention, an expected value is generated by the first party using the shortened random number it transmitted to the second party and copies 300 of the pad/expand operation 201, the deciphering algorithm 200, the enciphering algorithm 110, and the select/compress operation 102 and using the first party's own secret key. A comparator 120 determines whether the value generated by the copies 300 is the same as the value received from the second party. If the comparator indicates complete agreement, the probability that the second party has the same secret key as the first party is high, thereby authenticating the second party to the first party.

It will be understood that the each party provides information to the other in a manner that is error-free, thereby permitting the comparator's indication of agreement/disagreement to be also an authentication indication. For example, the parties may exchange information by messages sent through the air interface of a cellular communication system. Such messages are usually protected by error-correction coding and automatic repeat request (ARQ) techniques that ensure substantially error-free communication. It is not necessary, of course, to use a cellular air interface; other ways of providing the necessary information to each party can be employed.

If desired, the roles of the second party and the first party may now be reversed and a different random number can be used to authenticate the first party to the second party, thereby achieving bilateral authentication. The parties can then continue enciphered communication using their secret keys or derivations thereof for enciphering. Any derivations used must be derived by a mutually agreed process such as combining the secret key with one or more of a time/date stamp, a call number, a called party's telephone number, a caller's telephone number, a modified random number, and indeed all or any mixture of digits the two parties have in common. Such digits can be obtained in a manner such as those described in U.S. Pat. No. 5,604,806 and U.S. Pat. No. 5,745,578 to Hassan et al. and U.S. patent applications Ser. No. 08/555,968 and Ser. No. 09/015,774, both by Hassan et al., which relate to using characteristics of a radio channel, such as the short-term reciprocity and rapid decorrelation of phase, to establish key sequences for enciphered communication. In perhaps the simplest case, the modified random number may be used as an enciphering key for the call or communication session.

If in FIG. 6 the details within the boxes 300 are omitted, then FIG. 6 may be readily compared to the authentication method practiced in communication systems operating under the Global System for Mobile (GSM) communications standard. One apparent difference is Applicant's method of generating the rand value, comprising blocks 100, 101 in FIG. 6.

The '942, '250, '245, and '886 patents disclose that a preferred bilateral authentication method would have the effect of preventing the recipient of an attempt to initiate communication from making any reply or taking any inappropriate action if the attempt was received from a non-authentic source. Such attempts by a non-authentic party to engage an authentic party in communication usually have some fraud as an objective, but may alternatively be intended merely to cause a nuisance. For example, even formulating a "no" reply to a fraudulent signal can consume battery power in a handheld telephone, thereby reducing the battery life between charges. It would thus be preferable for information to be contained in the very first transmission from a communication-initiating first party to a second party that would allow the second party to authenticate the first party before replying. Such a method in accordance with Applicant's invention is depicted by FIG. 7.

Figure 7:
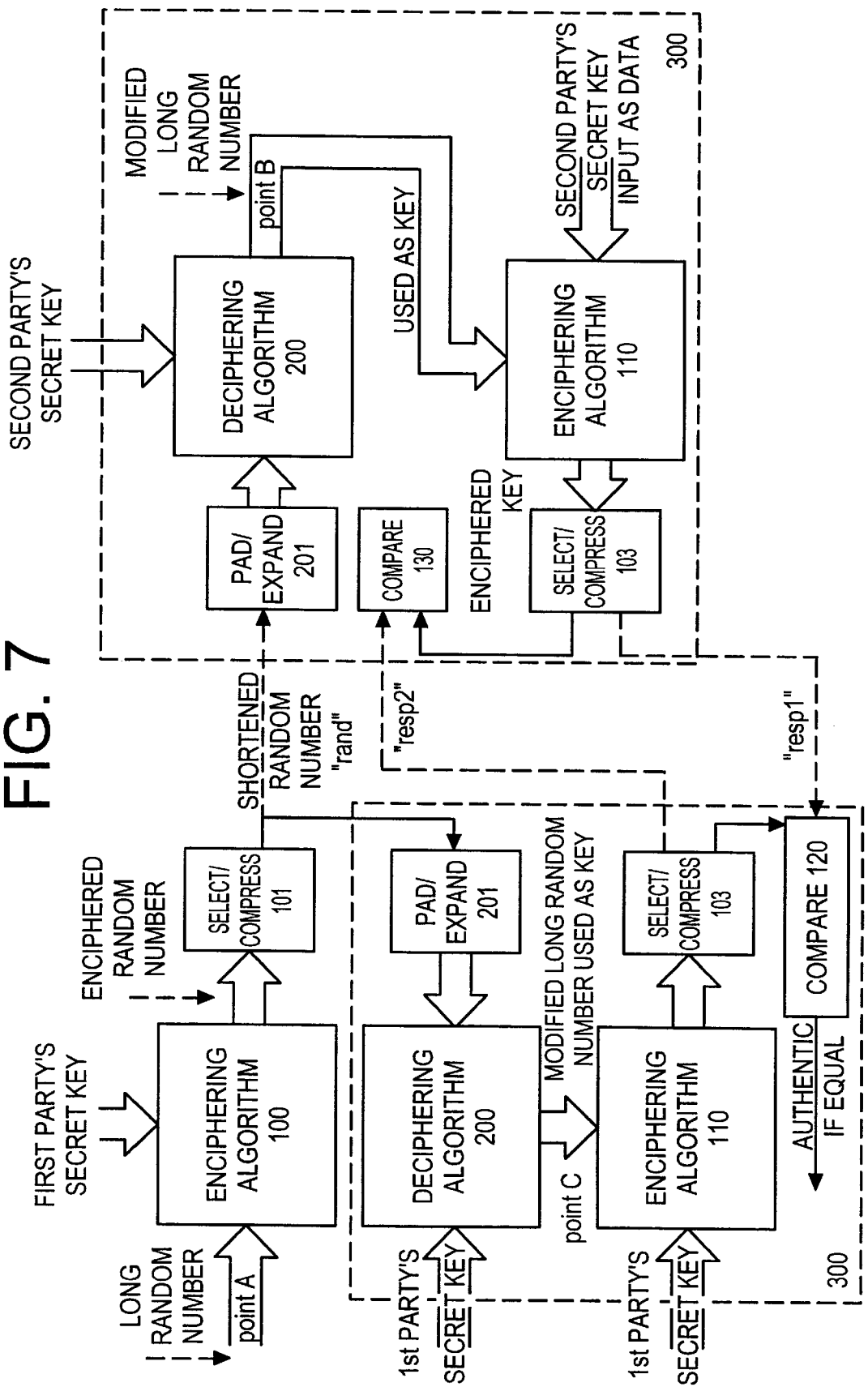
FIG. 7 illustrates an authentication method in accordance with the invention.

In FIG. 7, the first party performs the operations of blocks 100, 101, 201, 200, and 110 as described in connection with the identically numbered blocks in FIG. 6. One difference between FIGS. 6 and 7 is that block 103 in FIG. 7 indicates a modified select/compress operation that yields two selected or compressed output values based on the enciphered first party's secret key. To assist in comparison with the techniques described in the '250 and '245 patents, these two values can be called "resp1" and "resp2" and the shortened enciphered random number generated by the select/compress operation 101 can be called "rand". (If the operation 101 is not present, the enciphered random number can be called "rand".) Now the first party transmits both rand and resp2 to the second party.

The second party performs the operations of blocks 201, 200, and 110 as described in connection with the identically numbered blocks in FIG. 6. In FIG. 7, however, the second party has a counterpart of the first party's block 103. In this way, the second party's secret key is used to obtain corresponding values of resp1 and resp2, which will be equal to the first party's corresponding values only if the first party and the second party have the same secret key. A comparator 130 determines whether the second party's value resp2 matches the resp2 value received from the first party, and if they match, there is a high probability that the first party is authentic.

Only if the second party authenticates the first party will the second party transmit to the first party a reply that includes the second party's resp1 value. The first party then compares its own resp1 value to the resp1 value received from the second party using a comparator 120. If the values match, the first party has confirmed that the second party is probably authentic, completing the bilateral authentication process.

If desired, further bilateral authentication may take place by interchanging the roles of the first and second parties and, using a different random number, again performing the bilateral authentication illustrated by FIG. 7. This provides additional security over a bilateral authentication procedure performed only once as it permits the party desirous of authenticating the other to choose the random number, thereby eliminating the risk that previously intercepted (rand, resp1, resp2) values could be repeated by an eavesdropper. To reduce transmission overhead, the (rand, resp2) pair transmitted from the second party to the first party (in the second iteration of the bilateral authentication process) may be combined with the second party's transmission of the resp1 value (in the first iteration).

If in FIG. 7 the details within box 300 are omitted, then FIG. 7 may be readily compared to the methods described in the '942, '250, '245, and '886 patents such as that depicted in FIG. 4. One apparent difference is Applicant's method of generating the rand value, comprising blocks 100, 101 in FIG. 7.

The security provided by the method depicted in FIG. 7 can be enhanced by allowing both the first rand value transmitted from the first party to the second party and the second rand value transmitted from the second party to the first party to affect the second (resp1, resp2) pair of values transmitted from the second party to the first party. In this way, an eavesdropper would have had previously to intercept precisely that particular combination of the two rands in order to masquerade as a genuine party using the intercepted values. In this way, the second party receives a more powerful indication of the first party's authenticity, which is logical bearing in mind that fraud attempts would usually involve the fraudster being the initiating or first party.

In one aspect of Applicant's invention, the advantage of inhibiting responses to non-authentic challenges for improved security in both directions can be sacrificed if desired to obtain faster bilateral authentication. In this variation of the method depicted in FIG. 7, the first and second parties exchange respectively chosen random numbers and then each party computes a respective response (i.e., a resp1' value) using its respective secret key and the random number received from the other party. The parties then exchange these responses and compare them to the expected responses (i.e., resp1 values) that each can compute in the same manner as the other party.

Calling the first party A and the second party B, it is desirable to avoid the possibility of A's response to B being the same as B's response to A because such a condition has authentication value only if the responses are exchanged at precisely the same moment, precluding one party from merely echoing the other party's response. Accordingly, A and B should compute their responses in different manners. This may be generally recognized as an "A-to-B" algorithm that is used for one direction and a "B-to-A" algorithm that is used for the other direction.

This distinguishability can be achieved in several ways. The algorithm used by a party can depend on the party's status. For example, A might be a communication network and B might be a network subscriber terminal. For another example, a party could use one algorithm when it initiates a communication session and another algorithm when it responds to a session initiated by another. Having decided on an algorithm, the algorithms may be further distinguished by varying their inputs. For example, A's response to B can be computed by reversing the order of the digits of the random number received from B. For another example, A and/or B can change one of the bits of the random number or key from a ONE to a ZERO. For yet another example, A and B can swap the odd or even bits or digits of the response values calculated, the odd values being transmitted in one direction and the even values in the other direction. Several such distinctions can be combined to modify or choose the algorithms for the respective directions such that they are distinguishable from each other.

Another aspect of Applicant's invention can be called "cumulative authentication" that is advantageous in communication systems that are more tolerant of transmission overhead due to authentication. In cumulative authentication, A first releases a first digit of an authentication value to B, and B, upon verifying this first authentication digit, releases a second authentication digit to A, whereupon A, after verifying the second authentication digit, releases a third authentication digit to B, and so forth. Such cumulative authentication prevents release of a complete response in either direction upon any digit being detected to be incorrect, suggesting a non-authentic party.

Applicant's invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined given by the following claims, and all variations and equivalents that fall within the range of the claims are intended to be embraced therein.

I claim:

1. A method of authentication between first and second communication terminals in a communications network, the method comprising:

generating, in the first communication terminal, a first authentication challenge based on a first long random number and a secret key, the first authentication challenge having a fewer number of digits than the first long random number;

computing, in the first communication terminal, a first expected response value based on the first authentication challenge and the secret key;

providing the first authentication challenge to the second communication terminal; and computing, in the second communication terminal, a first response value based on the first authentication challenge and the secret key.

2. The method of claim 1, wherein generating the first authentication challenge comprises:

applying the first long random number and the secret key as input to an enciphering algorithm thereby producing an intermediate random number, wherein the number of digits in the intermediate random number is equal to or greater than the number of digits in the first long random number; and reducing the intermediate random number to produce the first authentication challenge having a number of digits that is less than the number of digits in the first long random number.

3. The method of claim 2, wherein reducing the intermediate random number comprises compressing the intermediate random number.

4. The method of claim 3, wherein computing the first expected response value comprises:

expanding the first authentication challenge;

deciphering the expanded first authentication challenge using the secret key to produce a modified long random number;

using the modified long random number as a key to encipher the secret key; and compressing the enciphered secret key to produce the first expected response value.

5. The method of claim 3, wherein computing the first response value comprises:

expanding the first authentication challenge;

deciphering the expanded first authentication challenge using the secret key to produce a modified long random number;

using the modified long random number as a key to encipher the secret key; and compressing the enciphered secret key to produce the first response value.

6. The method of claim 2, wherein reducing the intermediate random number comprises selecting a subset of digits from the intermediate random number.

7. The method of claim 6, wherein computing the first expected response value comprises:

padding the first authentication challenge to a desired number of digits;

deciphering the padded first authentication challenge using the secret key to produce a modified long random number;

using the modified long random number as a key to encipher the secret key; and selecting a subset of digits in the enciphered secret key to produce the first expected response value.

8. The method of claim 6, wherein computing the first response value comprises:

padding the first authentication challenge to a desired number of digits;

deciphering the padded first authentication challenge using the secret key to produce a modified long random number;

using the modified long random number as a key to encipher the secret key; and selecting a subset of digits in the enciphered secret key to produce the first response value.

9. The method of claim 1 further comprising generating a first authentication indication signal based on a comparison of the first response value with the first expected response value.

10. The method of claim 9, wherein generating the first authentication indication comprises:

providing the first expected response value from the first communication terminal to a processor;

providing the first response value from the second communication terminal to the processor; and comparing, in the processor, the first expected response value with the first response value.

11. The method of claim 10, wherein the processor is associated with the first communication terminal.

12. The method of claim 10, wherein the processor is in the communications network.

13. The method of claim 10, wherein the first communication terminal authenticates the identity of the second communication terminal when the first expected response value and the first response value are equal.

14. The method of claim 1 further comprising:

generating, in the second communication terminal, a second authentication challenge based on a second long random number and the secret key, the second authentication challenge having a fewer number of digits than the second long random number;

computing, in the second communication terminal, a second expected response value based on the second authentication challenge and the secret key; and providing the second authentication challenge to the first communication terminal; and computing, in the first communication terminal, a second response value based on the second authentication challenge and the secret key.

15. The method of claim 14, wherein generating the second authentication challenge comprises:

applying the second long random number and the secret key as input to an enciphering algorithm, thereby producing an intermediate random number, wherein the number of digits in the intermediate random number is equal to or greater than the number of digits in the second long random number; and reducing the intermediate random number to produce the second authentication challenge having a number of digits that is less than the number of digits in the second long random number.

16. The method of claim 15, wherein reducing the intermediate random number comprises compressing the intermediate random number.

17. The method of claim 16, wherein computing the second expected response value comprises:

expanding the second authentication challenge;

deciphering the expanded second authentication challenge using the secret key to produce a modified long random number;

using the modified long random number as a key to encipher the secret key; and compressing the enciphered secret key to produce the second expected response value.

18. The method of claim 16, wherein computing the second response value comprises:

expanding the second authentication challenge;

deciphering the expanded second authentication challenge using the secret key to produce a modified long random number;

using the modified long random number as a key to encipher the secret key; and compressing the enciphered secret key to produce the second response value.

19. The method of claim 15, wherein reducing the intermediate random number comprises selecting a subset of digits from the intermediate random number.

20. The method of claim 19, wherein computing the second expected response value comprises:
   padding the second authentication challenge to a desired number of digits;
   deciphering the padded second authentication challenge using the secret key to produce a modified long random number;
   using the modified long random number as a key to encipher the secret key; and
   selecting a subset of digits in the enciphered secret key to produce the second expected response value.

21. The method of claim 19, wherein computing the second response value comprises:
   padding the second authentication challenge to a desired number of digits;
   deciphering the padded second authentication challenge using the secret key to produce a modified long random number;
   using the modified long random number as a key to encipher the secret key; and
   selecting a subset of digits in the enciphered secret key to produce the second response value.

22. The method of claim 14 further comprising generating a second authentication indication signal based on a comparison of the second expected response value with the second response value.

23. The method of claim 22, wherein generating the second authentication indication signal comprises:
   providing the second expected response value from the second communication terminal to a processor;
   providing the second response value from the first communication terminal to the processor; and
   comparing, in the processor, the second expected response value with the second response value.

24. The method of claim 23, wherein the processor is associated with the second communication terminal.

25. The method of claim 23, wherein the processor is in the communications network.

26. The method of claim 23, wherein the second communication terminal authenticates the identity of the first communication terminal when the second expected response value and the second response value are equal.

27. The method of claim 14 wherein the first communications terminal is a network terminal and the second communications terminal is a subscriber terminal.

28. The method of claim 14 wherein the first communications terminal is a subscriber terminal and the second communications terminal is a network terminal.

29. The method of claim 1 further comprising:
   computing, at the first communication terminal, a second response value based on the first authentication challenge and the secret key;
   transmitting the second response value to the second communication terminal;
   computing, at the second communication terminal, a second expected response value based on the first authentication challenge and the secret key; and
   comparing, at the second communication terminal, the second response value with the second expected response value.

30. The method of claim 29, wherein the second communication terminal authenticates the first communication terminal if the second response value is equal to the second expected response value.

31. The method of claim 30 wherein the second communications terminal provides the first communications terminal with the first response value if the second response value is equal to the second expected response value.

32. The method of claim 31 further comprising comparing, at the first communication terminal, the first expected response value with the first response value.

33. The method of claim 32 wherein the first communications terminal authenticates the second communications terminal if the first response value is equal to the first expected value.

34. A method of authenticating a remote communication terminal, the method comprising:
   providing an authentication challenge based on a random number and secret key to the remote communication terminal, the authentication challenge having a fewer number of digits than the random number;
   computing, at the local terminal, an expected response based on the authentication challenge and the secret key;
   computing, at the remote terminal, a response based on the authentication challenge and the secret key; and
   comparing, at the local terminal, the response with the expected response, and authenticating the remote terminal if the response is equal to the expected response.

35. The method of claim 34 wherein the local terminal is a network terminal.

36. The method of claim 34 wherein the remote terminal is a network terminal.

* * * * *